(12) United States Patent
Inanc et al.

(10) Patent No.: US 9,753,177 B2
(45) Date of Patent: Sep. 5, 2017

(54) STANDOFF SPECIFIC CORRECTIONS FOR DENSITY LOGGING

(71) Applicant: Baker Hughes Incorporated, Houston, TX (US)

(72) Inventors: Feyzi Inanc, Spring, TX (US); Joseph C. Koudelka, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 112 days.

(21) Appl. No.: 14/077,721

(22) Filed: Nov. 12, 2013

(65) Prior Publication Data
US 2015/0129753 A1    May 14, 2015

(51) Int. Cl.
G01V 5/12    (2006.01)
G01V 1/50    (2006.01)
G01V 11/00   (2006.01)

(52) U.S. Cl.
CPC .............. *G01V 5/125* (2013.01); *G01V 1/50* (2013.01); *G01V 11/00* (2013.01)

(58) Field of Classification Search
CPC ............. G01V 5/125; G01V 5/04; G01V 1/50
USPC ...... 250/269.3, 266, 254, 256, 262; 702/6, 8
See application file for complete search history.

(56) References Cited

U.S. PATENT DOCUMENTS

| | | | |
|---|---|---|---|
| 4,678,765 A * | 7/1987 | Chiang et al. | 502/65 |
| 5,051,581 A * | 9/1991 | Hertzog et al. | 250/266 |
| 5,091,644 A | 2/1992 | Minette | |
| 5,175,429 A | 12/1992 | Hall, Jr. et al. | |
| 5,390,115 A | 2/1995 | Case et al. | |
| 5,397,893 A | 3/1995 | Minette | |
| 5,486,695 A * | 1/1996 | Schultz | E21B 47/082 250/254 |
| 5,513,528 A * | 5/1996 | Holenka et al. | 73/152.03 |
| 5,525,797 A | 6/1996 | Moake | |
| 5,841,135 A | 11/1998 | Stoller et al. | |
| 5,912,460 A | 6/1999 | Stoller et al. | |

(Continued)

OTHER PUBLICATIONS

Best, David et al., "An Innovative Approach to Correct Density Measurements While Drilling for Hole Size Effect," SPWLA Annual Logging Symposium, 1990-G, 21 pp (1990).

(Continued)

*Primary Examiner* — David Porta
*Assistant Examiner* — Blake Riddick
(74) *Attorney, Agent, or Firm* — Mossman, Kumar & Tyler, PC

(57) ABSTRACT

Methods, systems, devices, and products for estimating a parameter of interest of a volume of an earth formation. Methods may include correcting a measurement relating to the parameter of interest by a downhole tool using at least one correction model determined from a plurality of predefined models. The at least one correction model may be determined based on an estimated borehole standoff of the tool from the borehole wall that is associated with the measurement. Correcting the measurement may include determining a correction factor using the correction model and applying the correction factor to the measurement. Each of the plurality of predefined models may be associated with each of a plurality of standoff bins, wherein each of the plurality of standoff bins is defined as a mutually exclusive interval of distance values from the downhole tool to the borehole wall.

16 Claims, 6 Drawing Sheets

(56) References Cited

U.S. PATENT DOCUMENTS

| | | | |
|---|---|---|---|
| 6,307,199 B1 | 10/2001 | Edwards et al. | |
| 6,566,649 B1* | 5/2003 | Mickael | G01V 5/125 250/269.3 |
| 6,584,837 B2* | 7/2003 | Kurkoski | 73/152.02 |
| 6,696,684 B2 | 2/2004 | Radtke et al. | |
| 6,918,293 B2 | 7/2005 | Moake et al. | |
| 7,284,605 B2 | 10/2007 | Clark et al. | |
| 7,432,500 B2 | 10/2008 | Sale | |
| 7,809,508 B2 | 10/2010 | Desport | |
| 8,000,899 B2 | 8/2011 | Stoller et al. | |
| 2004/0021066 A1* | 2/2004 | Schneider et al. | 250/266 |
| 2009/0043509 A1* | 2/2009 | Madigan et al. | 702/8 |
| 2010/0118653 A1* | 5/2010 | He | G01V 1/303 367/57 |
| 2010/0145621 A1* | 6/2010 | Moake | G01V 5/08 702/8 |
| 2011/0257886 A1* | 10/2011 | Itskovich et al. | 702/7 |
| 2012/0109382 A1* | 5/2012 | Dashevskiy et al. | 700/275 |
| 2012/0318968 A1* | 12/2012 | Inanc | 250/269.1 |
| 2013/0008655 A1* | 1/2013 | Le | E21B 43/1195 166/297 |

OTHER PUBLICATIONS

Spross, R.L., et al., "Accurate MWD Density Measurements With Very Large Standoffs," SPWLA Annual Logging Symposium, 1995-UU, 12 pp. (1995).

Moake, G.L., et al., "Reduction of Standoff Effects on LWD Density and Neutron Measurements," SPWLA Annual Logging Symposium, 1996-V, 14 pp. (1996).

Minette, Daniel C., et al., "Utilizing Acoustic Standoff Measurements to Improve the Accuracy of Density and Neutron Measurements," SPE-56447, Society of Petroleum Engrs., 14 pp. (Oct. 1999).

* cited by examiner

US 9,753,177 B2

STANDOFF SPECIFIC CORRECTIONS FOR DENSITY LOGGING

FIELD OF THE DISCLOSURE

This disclosure generally relates to borehole logging methods and apparatuses for estimating formation properties using nuclear radiation based measurements.

BACKGROUND OF THE DISCLOSURE

Oil well logging has been known for many years and provides an oil and gas well driller with information about the particular earth formation being drilled. In conventional oil well logging, during well drilling and/or after a well has been drilled, a nuclear radiation source and associated nuclear radiation sensors may be conveyed into the borehole and used to determine one or more parameters of interest of the formation. A rigid or non-rigid conveyance device is often used to convey the nuclear radiation source, often as part of a tool or a set of tools, and the carrier may also provide communication channels for sending information up to the surface.

SUMMARY OF THE DISCLOSURE

In aspects, the present disclosure is related to methods and apparatuses for estimating at least one parameter of interest of a volume of interest of an earth formation using nuclear radiation based measurements.

One embodiment may include a method of estimating a parameter of interest of a volume of an earth formation. The parameter of interest may be at least one of: i) bulk density; ii) porosity; and iii) density. Methods may include correcting a measurement relating to the parameter of interest by a downhole tool using at least one correction model determined from a plurality of predefined models, the at least one correction model being determined based on an estimated borehole standoff of the tool from the borehole wall that is associated with the measurement. Correcting the measurement may include determining a correction factor using the correction model and applying the correction factor to the measurement. Each of the plurality of predefined models may be associated with each of a plurality of standoff bins. Each of the plurality of standoff bins may be defined as a mutually exclusive interval of distance values from the downhole tool to the borehole wall. Correcting the measurement may include applying to the measurement the at least one correction model corresponding to the estimated borehole standoff associated with the measurement.

Each of the plurality of predefined models may be mutually exclusive to the associated bin. Each of the plurality of predefined models may include a corresponding one of a plurality of bin specific ribs. Each of the plurality of bin specific ribs may be determined from pre-existing results. Methods may also include correcting the measurement using a plurality of weighted correction models; and/or selecting bins with a threshold number of measurements and weighting each correction model corresponding to each selected bin according a formula. Each predefined model of the plurality of predefined models may be represented as a function of the measurement. Each correction model of the at least one correction model may be represented as a function of the measurement and the standoff.

Methods may also include determining the estimated standoff. Determining the estimated standoff may be carried out by at least one of: i) deriving the estimated standoff from mechanical measurements; ii) deriving the estimated standoff from acoustic measurements; iii) predicting the estimated standoff from nuclear measurement. Methods may also include generating the radiation information using a sensor in a borehole in the earth formation. Methods may also include at least one of (a) conveying the downhole tool into a borehole intersecting the volume; (b) rotating the tool; (c) making a plurality of measurements relating to the parameter of interest using nuclear sensors on the downhole tool over a time interval during continuing rotation of the tool. The nuclear sensors may comprise at least one long spaced (LS) detector and at least one short spaced (SS) detector, and making the plurality of measurements may be carried out by receiving a plurality of responses from the at least one long spaced (LS) detector and the at least one short spaced (SS) detector over a time interval during continuing rotation of the tool; determining a standoff associated with each of said LS and SS response; and using a conventional spine and rib method for determining from said plurality of LS and SS measurements and their associated standoffs the plurality of measurements.

Other embodiments may include an apparatus for estimating a parameter of interest of a volume of an earth formation. The apparatus may include a conveyance device configured to be conveyed in a borehole intersecting the earth formation, the conveyance device comprising at least one nuclear sensor configured to make measurements of the volume relating to the parameter of interest; a caliper associated with the conveyance device and configured to determine a standoff of the at least one sensor relative to a wall of the borehole; and a processor configured to correct a measurement of the at least one sensor using at least one correction model determined from a plurality of predefined models according to an estimated borehole standoff associated with the measurement.

Another embodiment according to the present disclosure may be an apparatus for estimating a parameter of an earth formation, comprising: a processor; a subsystem non-transitory computer-readable medium; and a program stored by the non-transitory computer-readable medium comprising instructions that, when executed, cause the processor to perform methods described herein.

Another embodiment according to the present disclosure may be a non-transitory computer-readable medium product for estimating at least one parameter of interest of a volume of an earth formation, comprising: instructions disposed on the medium that, when executed by a processor, cause the at least one processor to: correct a measurement relating to the parameter of interest by a downhole tool using at least one correction model determined from a plurality of predefined models, the at least one correction model being determined based on an estimated borehole standoff of the tool from the borehole wall that is associated with the measurement.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1:
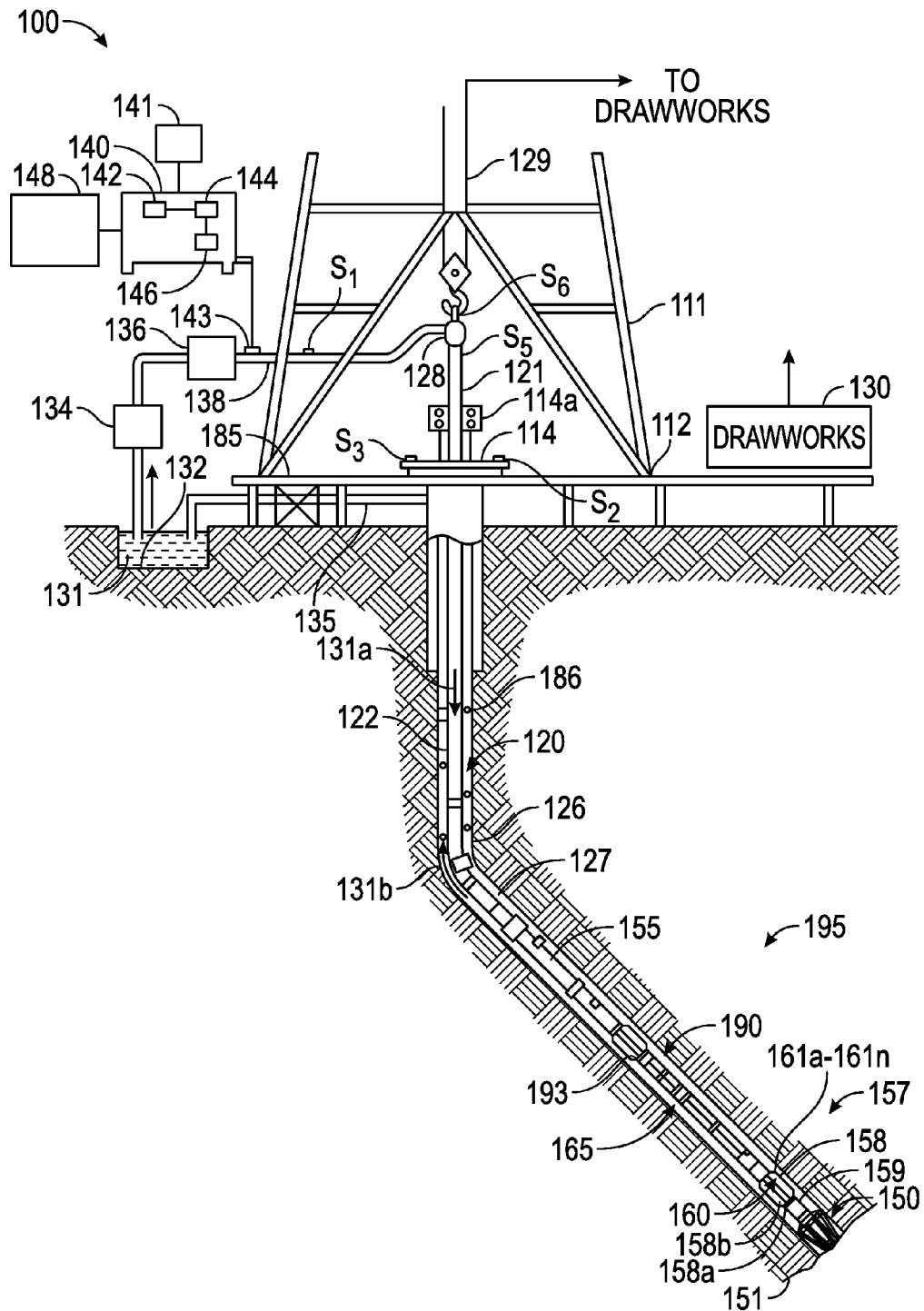
FIG. 1 schematically illustrates a drilling system in accordance with embodiments of the present disclosure.

In aspects, this disclosure relates to estimating at least one parameter of interest of a volume of interest using radiation from the volume. The volume may include an earth formation, such as, for example, an earth formation surrounding a borehole. The parameter of interest may be a physical characteristic of the volume, such as, for example, density.

In aspects, this disclosure relates to using a downhole tool to detect radiation from a subterranean formation. In many instances, the information used for these estimations may be acquired by tools deployed into a wellbore (borehole) intersecting one or more formations of interest. In some aspects, this disclosure relates to formation density logging in real time using gamma rays in a measurement-while-drilling (MWD) tool. For context, an exemplary system for deploying and using such tools to acquire this information is described below.

In some embodiments, the detectors may detect radiation from naturally occurring radionuclides. In other embodiments, the formation may be exposed to energy from a radiation source. Downhole tools may include this radiation source and one or more detectors. Herein, the radiation source may include, but is not limited to, one or more of a neutron source, a and a gamma-ray source, and an x-ray source. The detectors may be used to detect radiation from the formation, though the detectors are not limited to detecting radiation of the same type as emitted by the radiation source. Detectors may include at least one radiation responsive element, such as a scintillation media (e.g., bismuth germanium oxide ('BGO'), or doped glass) or a semiconductor material (e.g., gallium nitride); and at least one output device (e.g., a photomultiplier tube) generating information in response to scintillations in the radiation responsive element. Detectors may have shielding to prevent the counting of radiation from unintended sources.

Conventional density measurements determine the count rates of the radiation that were emitted by a well characterized gamma ray source. The detected count rates are understood to correspond to the density of the formation. Through comparison of source intensity and the measured gamma ray intensity, a density value is estimated. Conventional density measurements in nuclear logging are based on having a very stable (predictable) radiation source with a substantially constant intensity. The source is unitary. For example, gamma ray density measurement systems may utilize a point source of gamma rays, such as Cesium-137.

Wireline gamma ray density probes are well known and comprise devices incorporating a gamma ray source and gamma ray detectors, shielded from each other to prevent counting of radiation emitted directly from the source. During operation of the probe, gamma rays emitted from the source enter the formation to be studied, and interact with the atoms of the formation material by photoelectric absorption, by Compton scattering, or by pair production. Measurement-while-drilling logging is also known, and either partly or totally eliminates the necessity of interrupting the drilling operation to remove the drillstring from the borehole in order to make the necessary measurements by wireline techniques. One aspect of MWD logging tools is that measurements are typically made while the tool is rotating. This may cause variations in the spacing between the logging tool and the borehole wall ('standoff') with respect to azimuth. Nuclear measurements may be particularly degraded by large standoffs due to the scattering produced by borehole fluids between the tool and the formation.

More recently, the density measurement is combined with the measurement from a borehole caliper, such as an acoustic caliper. The acoustic caliper continuously measures the standoff as the tool is rotating around the borehole. If the caliper is aligned with the density source and detectors, this gives a determination of the standoff in front of the detectors at any given time. This information may be used to separate the density data into a number of bins based on the amount of standoff. After a pre-set time interval, the density measurement can then be made. The first step in this process is for short space (SS) and long space (LS) densities to be calculated from the data in each bin. After that, corrections are applied to LS density to obtain compensated density for each bin. Then, these density measurements are combined in a manner that minimizes the total error in the density calculation. The spine and rib correction method determines by empirical methods a correction to the density measurement made by the long spaced detector (LS) using the difference between the LS and the short spaced detector SS measurements. That is, a nominal value of the SS measurements may be used to correct the nominal value of the LS measurements. Implicit in such traditional methods is the assumption that the spine and rib is uniquely determined by a single correction.

The spine and rib may be created using pre-existing data from controlled or uncontrolled tests (e.g., experimental results), or obtained from a preexisting simulation or engineering model. Pre-existing data may be defined herein as data occurring before the measurement. In some cases this data may exist prior to conveyance of the tool in the borehole. Models may be generated using information available from testing, such as field tests or tests in a laboratory environment. For example, the spine and rib may be determined under laboratory conditions with the tool in boreholes of reference rocks and immersed in drilling fluid of various characteristics (e.g., weights).

In reality, there is more than one spine and rib relation, and the actual correction to be applied depends upon numerous factors including the standoff and the composition of the mud. As would be known to those versed in the art, drilling mud includes minerals such as Barite that have a significant gamma ray attenuation. As a result of this, it is commonly found that even after applying a single spine and rib correction, there is a significant variation in corrected density measurements with standoff. As standoff increases, both LS and SS density measurements deviate from nominal values significantly. For example, in very low density borehole fluids, both SS and LS density values are significantly lower than the nominal values. For such a case, inaccuracy of the predictions is a function of the magnitude of the standoff. Aspects of the present disclosure include correcting a measurement using at least one borehole standoff correction model determined based on an estimated borehole standoff associated with the measurement.

A logging tool is conveyed on a drill collar includes a long spaced (LS) and a short spaced (SS) nuclear sensor. Measurements are made using the nuclear sensors on the logging tool over a time interval. These measurements may be taken while rotating the tool with the drill collar. Standoffs corresponding to each of said LS and SS measurements are determined. A plurality of standoff bins is defined using measurements made by a standoff measuring device. A processor is used for determining from the LS and SS measurements a corrected density that compensates for the standoff effects.

Each of the embodiments herein may be used in a variety of settings in both drilling and non-drilling environments. In some implementations, the disclosed embodiments may be used as part of a drilling system. FIG. 1 is a schematic diagram of an exemplary drilling system 100 that includes a drill string having a drilling assembly attached to its bottom end that includes a steering unit according to one embodiment of the disclosure. FIG. 1 shows a drill string 120 that includes a drilling assembly or bottomhole assembly (BHA) 190 conveyed in a borehole 126. The drilling system 100 includes a conventional derrick 111 erected on a platform or floor 112 which supports a rotary table 114 that is rotated by a prime mover, such as an electric motor (not shown), at a desired rotational speed. A tubing (such as jointed drill pipe 122), having the drilling assembly 190, attached at its bottom end extends from the surface to the bottom 151 of the borehole 126. A drill bit 150, attached to drilling assembly 190, disintegrates the geological formations when it is rotated to drill the borehole 126. The drill string 120 is coupled to a drawworks 130 via a Kelly joint 121, swivel 128 and line 129 through a pulley. Drawworks 130 is operated to control the weight on bit ("WOB"). The drill string 120 may be rotated by a top drive (not shown) instead of by the prime mover and the rotary table 114. Alternatively, a coiled-tubing may be used as the tubing 122. A tubing injector 114a may be used to convey the coiled-tubing having the drilling assembly attached to its bottom end. The operations of the drawworks 130 and the tubing injector 114a are known in the art and are thus not described in detail herein.

A suitable drilling fluid 131 (also referred to as the "mud") from a source 132 thereof, such as a mud pit, is circulated under pressure through the drill string 120 by a mud pump 134. The drilling fluid 131 passes from the mud pump 134 into the drill string 120 via a desurger 136 and the fluid line 138. The drilling fluid 131a from the drilling tubular discharges at the borehole bottom 151 through openings in the drill bit 150. The returning drilling fluid 131b circulates uphole through the annular space 127 between the drill string 120 and the borehole 126 and returns to the mud pit 132 via a return line 135 and drill cutting screen 185 that removes the drill cuttings 186 from the returning drilling fluid 131b. A sensor $S_1$ in line 138 provides information about the fluid flow rate. A surface torque sensor $S_2$ and a sensor $S_3$ associated with the drill string 120 respectively provide information about the torque and the rotational speed of the drill string 120. Tubing injection speed is determined from the sensor $S_5$, while the sensor $S_6$ provides the hook load of the drill string 120.

In some applications, the drill bit 150 is rotated by only rotating the drill pipe 122. However, in many other applications, a downhole motor 155 (mud motor) disposed in the drilling assembly 190 also rotates the drill bit 150. The rate of penetration (ROP) for a given BHA largely depends on the WOB or the thrust force on the drill bit 150 and its rotational speed.

The mud motor 155 is coupled to the drill bit 150 via a drive shaft disposed in a bearing assembly 157. The mud motor 155 rotates the drill bit 150 when the drilling fluid 131 passes through the mud motor 155 under pressure. The bearing assembly 157, in one aspect, supports the radial and axial forces of the drill bit 150, the down-thrust of the mud motor 155 and the reactive upward loading from the applied weight-on-bit.

A surface control unit or controller 140 receives signals from the downhole sensors and devices via a sensor 143 placed in the fluid line 138 and signals from sensors $S_1$-$S_6$ and other sensors used in the system 100 and processes such signals according to programmed instructions provided to the surface control unit 140. The surface control unit 140 displays desired drilling parameters and other information on a display/monitor 141 that is utilized by an operator to control the drilling operations. The surface control unit 140 may be a computer-based unit that may include a processor 142 (such as a microprocessor), a storage device 144, such as a solid-state memory, tape or hard disc, and one or more computer programs 146 in the storage device 144 that are accessible to the processor 142 for executing instructions contained in such programs. The surface control unit 140 may further communicate with a remote control unit 148. The surface control unit 140 may process data relating to the drilling operations, data from the sensors and devices on the surface, data received from downhole, and may control one or more operations of the downhole and surface devices. The data may be transmitted in analog or digital form.

The BHA 190 may also contain formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 195 surrounding the BHA 190. Such sensors are generally known in the art and for convenience are generally denoted herein by numeral 165. The BHA 190 may further include a variety of other sensors and devices 159 for determining one or more properties of the BHA 190 (such as vibration, bending moment, acceleration, oscillations, whirl, stick-slip, etc.) and drilling operating parameters, such as weight-on-bit, fluid flow rate, pressure, temperature, rate of penetration, azimuth, tool face, drill bit rotation, etc.) For convenience, all such sensors are denoted by numeral 159.

The BHA 190 may include a steering apparatus or tool 158 for steering the drill bit 150 along a desired drilling path. In one aspect, the steering apparatus may include a steering unit 160, having a number of force application members 161a-161n, wherein the steering unit is at partially integrated into the drilling motor. In another embodiment the steering apparatus may include a steering unit 158 having a bent sub and a first steering device 158a to orient the bent sub in the wellbore and the second steering device 158b to maintain the bent sub along a selected drilling direction.

The drilling system 100 may include sensors, circuitry and processing software and algorithms for providing information about desired dynamic drilling parameters relating to the BHA, drill string, the drill bit and downhole equipment such as a drilling motor, steering unit, thrusters, etc. Exemplary sensors include, but are not limited to drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stickslip, torque, shock, vibration, strain, stress, bending moment, bit bounce, axial thrust, friction, backward rotation, BHA buckling, and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES INCORPORATED.

The drilling system 100 can include one or more downhole processors at a suitable location such as 193 on the BHA 190. The processor(s) can be a microprocessor that uses a computer program implemented on a suitable non-transitory computer-readable medium that enables the processor to perform the control and processing. The non-transitory computer-readable medium may include one or more ROMs, EPROMs, EAROMs, EEPROMs, Flash Memories, RAMs, Hard Drives and/or Optical disks. Other equipment such as power and data buses, power supplies, and the like will be apparent to one skilled in the art. In one embodiment, the MWD system utilizes mud pulse telemetry to communicate data from a downhole location to the surface while drilling operations take place. The surface processor 142 can process the surface measured data, along with the data transmitted from the downhole processor, to evaluate formation lithology. While a drill string 120 is shown as a conveyance system for sensors 165, it should be understood that embodiments of the present disclosure may be used in connection with tools conveyed via rigid (e.g. jointed tubular or coiled tubing) as well as non-rigid (e.g. wireline, slickline, e-line, etc.) conveyance systems. The drilling system 100 may include a bottomhole assembly and/or sensors and equipment for implementation of embodiments of the present disclosure on either a drill string or a wireline. A point of novelty of the system illustrated in FIG. 1 is that the surface processor 142 and/or the downhole processor 193 are configured to perform certain methods (discussed below) that are not in prior art.

Figures 2, 3:
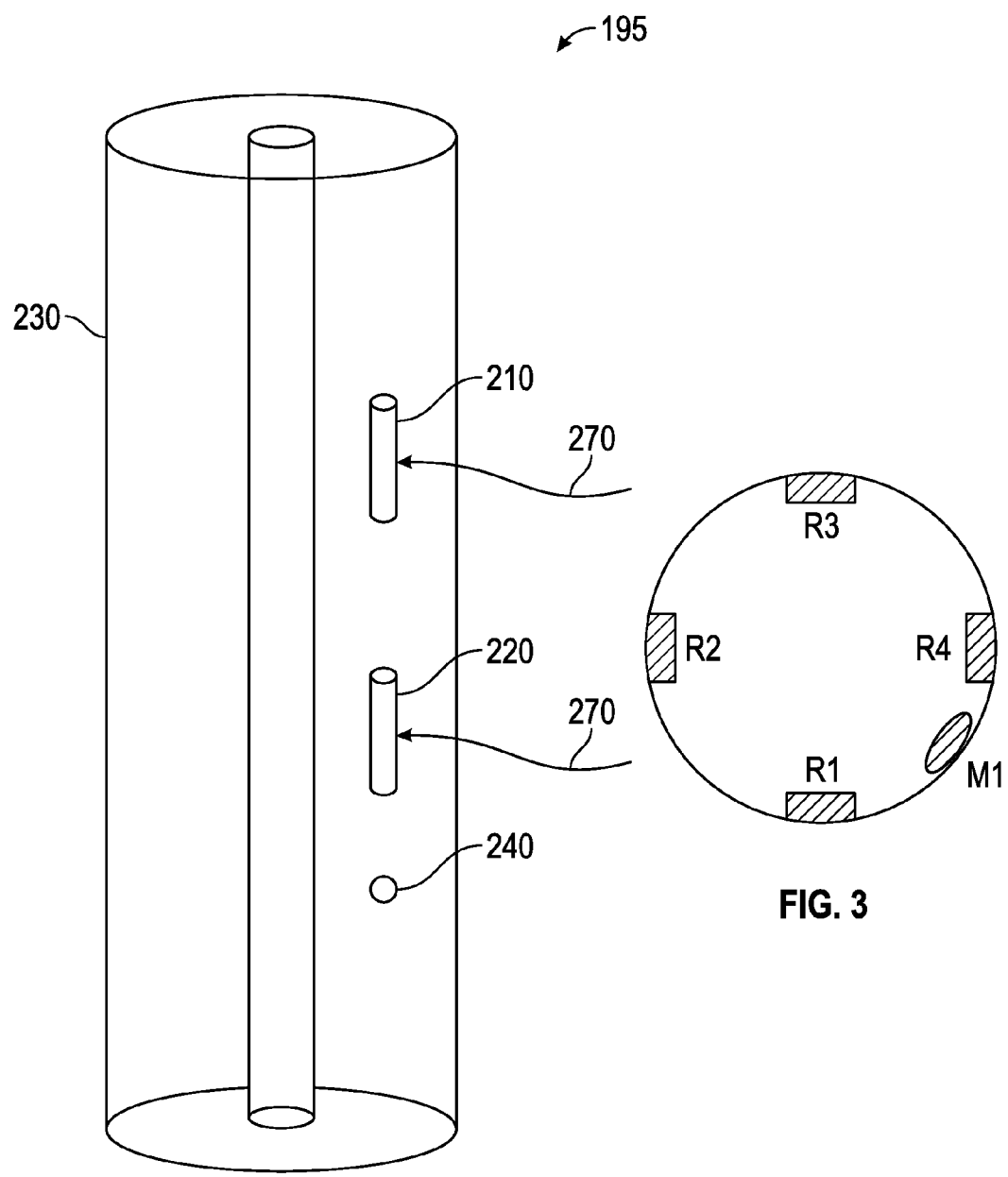
FIG. 2 illustrates a nuclear detection module in accordance with embodiments of the invention.
FIG. 3 illustrates cross section of an acoustic caliper device in accordance with embodiments of the invention.

FIG. 2 shows a nuclear detection module 200 that may be incorporated in BHA 190, such as along with evaluation sensors 165 according to one embodiment of the present disclosure. The nuclear detection module 200 may include one or more sensors 210, 220 configured to detect nuclear radiation disposed along a drill collar 230. The one or more nuclear radiation sensors 210, 220 may be spaced at different distances along the drill collar 230 apart from a radiation source 240. While a drill string is shown as a conveyance system for nuclear detection module 200, it should be understood that embodiments of the present disclosure may be used in connection with tools conveyed via rigid (e.g. jointed tubular or coiled tubing) as well as non-rigid (e.g. wireline, slickline, e-line, etc.) conveyance systems. The nuclear radiation sensors 210, 220 may include detectors configured to detect gamma rays. In some embodiments, at least one parameter of interest may include density.

FIG. 3 illustrates cross section of an acoustic caliper device. Four sensors R1, R2, R3 and R4 are shown circumferentially disposed around the drill collar with an azimuthal separation of 90 degrees. Each sensor uses acoustic measurements to determine a travel time to the closest point on the borehole. In some embodiments, a magnetometer M1 may be used to determine toolface.

Counts from each detector are binned by tool stand-off. Binning combined with a traditional (single) spine and rib technique provides a measurement in larger boreholes that is better than one that does not use a standoff measurements. To some extent binning compensates for BHA whirl and enlarged hole. However, more accurate results are achieved by correcting the measurements according to bin-specific algorithms. For example, the model used to determine a correction factor may be determined based on an estimated borehole standoff associated with the measurement. The model for each bin may be determined from a plurality of predefined models. Each of a plurality of predefined models may be associated with each of a plurality of standoff bins, and may be mutually exclusive to the associated bin. Predefined models are determined from pre-existing data and may be associated with specific bins prior to conveyance of the tool in the borehole.

Correcting the measurement may then be carried out by applying to the measurement the borehole standoff correction model corresponding to the estimated borehole standoff for the measurement. In some embodiments, predefined correction ribs are developed for specific standoff values, or value ranges.

Figure 4:
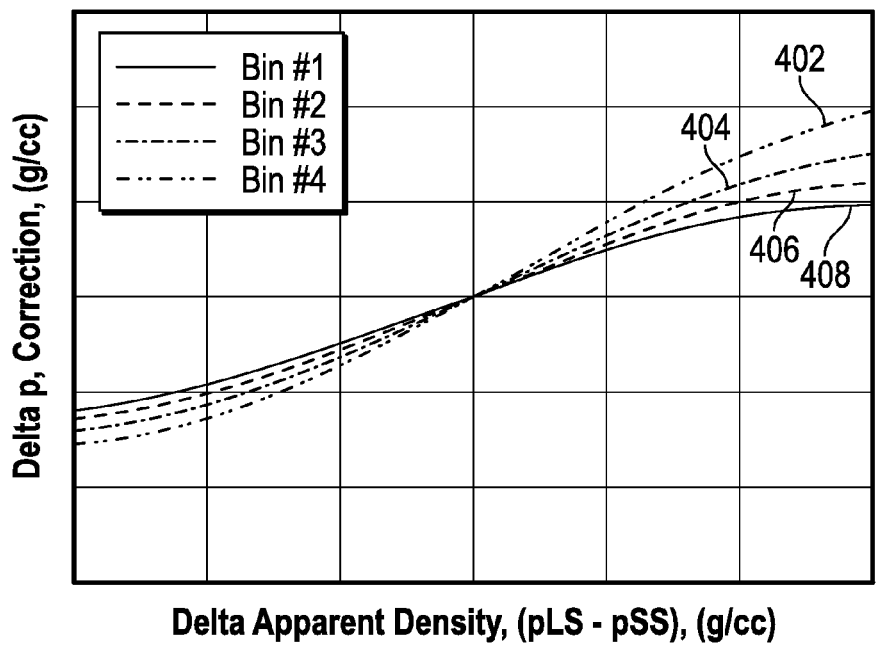
FIG. 4 shows density correction plots illustrating density correction values for different standoffs in accordance with embodiments of the present disclosure.

FIG. 4 shows density correction plots illustrating density correction values for different standoffs in accordance with embodiments of the present disclosure. During or after measurement, data may be grouped into discrete standoff bins. Each of the plurality of standoff bins may be defined as a mutually exclusive interval of distance values from the downhole tool (or the sensor) to the borehole wall. Each curve 402-408 corresponds with a specific bin. The curve corresponding to the bin may be applied to measurements in the bin. Thus, a correction factor may be determined using a rib that was developed for that specific standoff bin value prior to conveyance of the tool in the borehole.

In embodiments, a correction may be calculated for each bin using an algorithm specific to that bin. Then, the LS density may be corrected using the correction from that specific bin. This may be repeated for all bins, and the results may be combined into a compensated bulk density value using certain weights for each bin.

In other embodiments, a specific standoff correction model may be determined for each standoff value in continuum of standoff values using a continuous corrections algorithm. Using two sets of continuous data, a weighted correction value is determined for use in correcting the LS measurement. For example, estimated standoff may be used to obtain a standoff profile.

Figure 5:
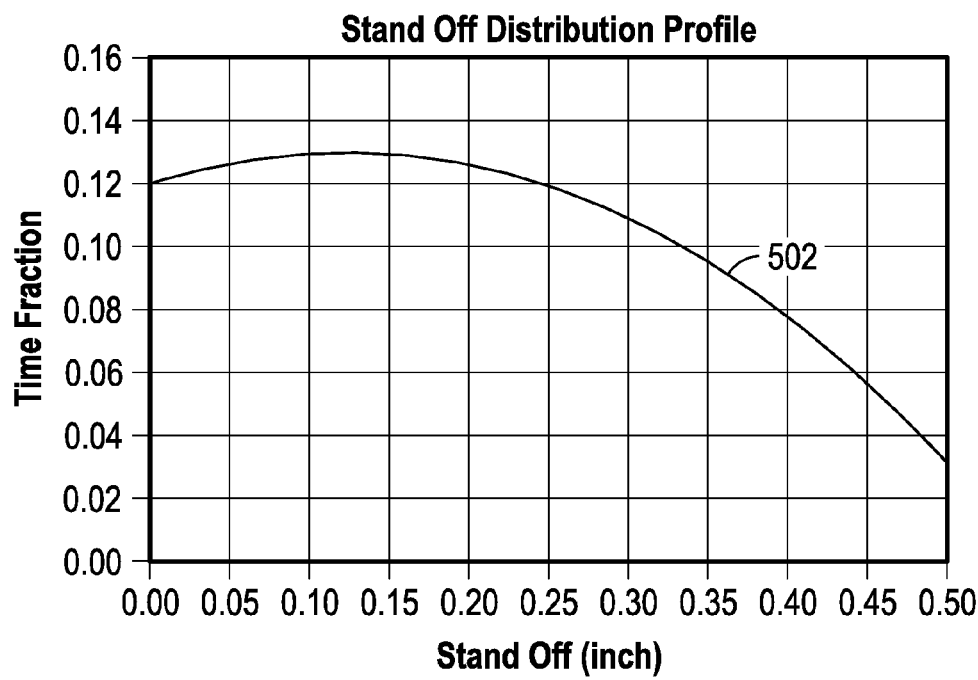
FIG. 5 shows a graphic illustration of standoff distribution profile in accordance with embodiments of the present disclosure.

FIG. 5 shows a graphic illustration of standoff distribution profile 502 in accordance with embodiments of the present disclosure. In this approach, instead of defining ribs for specific standoff values (e.g., bins), the ribs (602-608, FIG. 6) are processed to form a virtual surface (610, FIG. 6) representing a continuously varying standoff. This results in a surface based on both standoff and the delta apparent parameter, also referred to herein as a "surface rib."

Figure 6:
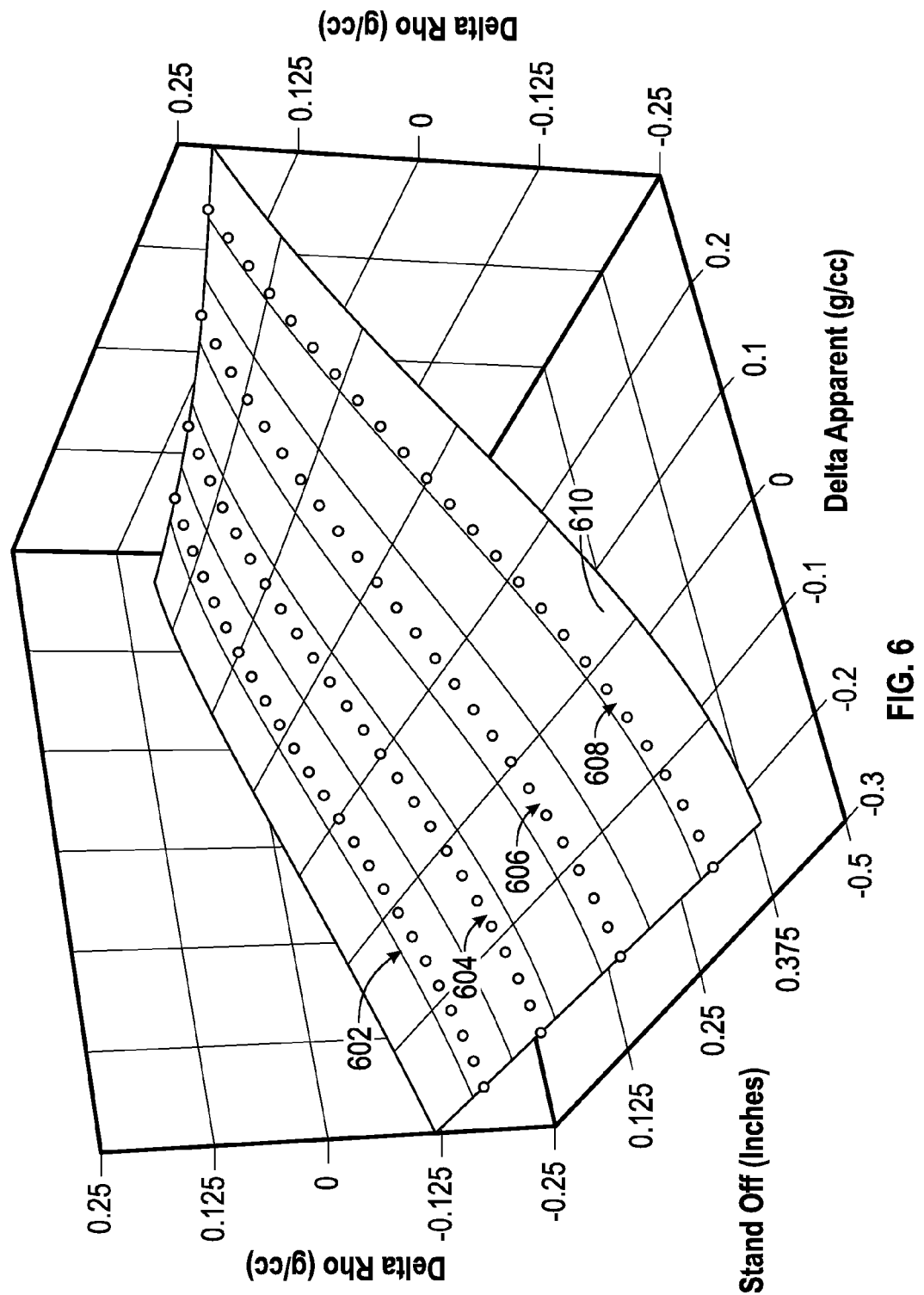
FIG. 6 illustrates a surface rib in accordance with embodiments of the present disclosure.

FIG. 6 illustrates a surface rib 610 in accordance with embodiments of the present disclosure. Since we have two continuous functions, some implementations may include weighting of rib corrections with the standoff profile to obtain a weighted correction. The mathematical expression for that approach is given by the following equation:

$$\overline{\Delta\rho} = \int_{Min\ Std}^{Max\ Std} \Delta\rho(r) \text{Std}(r) dr.$$

The average correction obtained in this manner may then be added to the measured LS density value to obtain the final compensated bulk density value.

Accuracy of the gamma ray device may be affected if the count within a region (e.g., bin) is too small. Detector spacing, shielding, and collimation may also be selected to maximize response accuracy and minimize statistical effects. This increases the number of counts within each standoff bin. Embodiments may also include adjusting the number of bins in dependence upon the distribution of values in a proposed set of bins. For example, the range of standoff values for each bin may be increased or decreased to optimize the number of data points within each bin.

Figure 7:
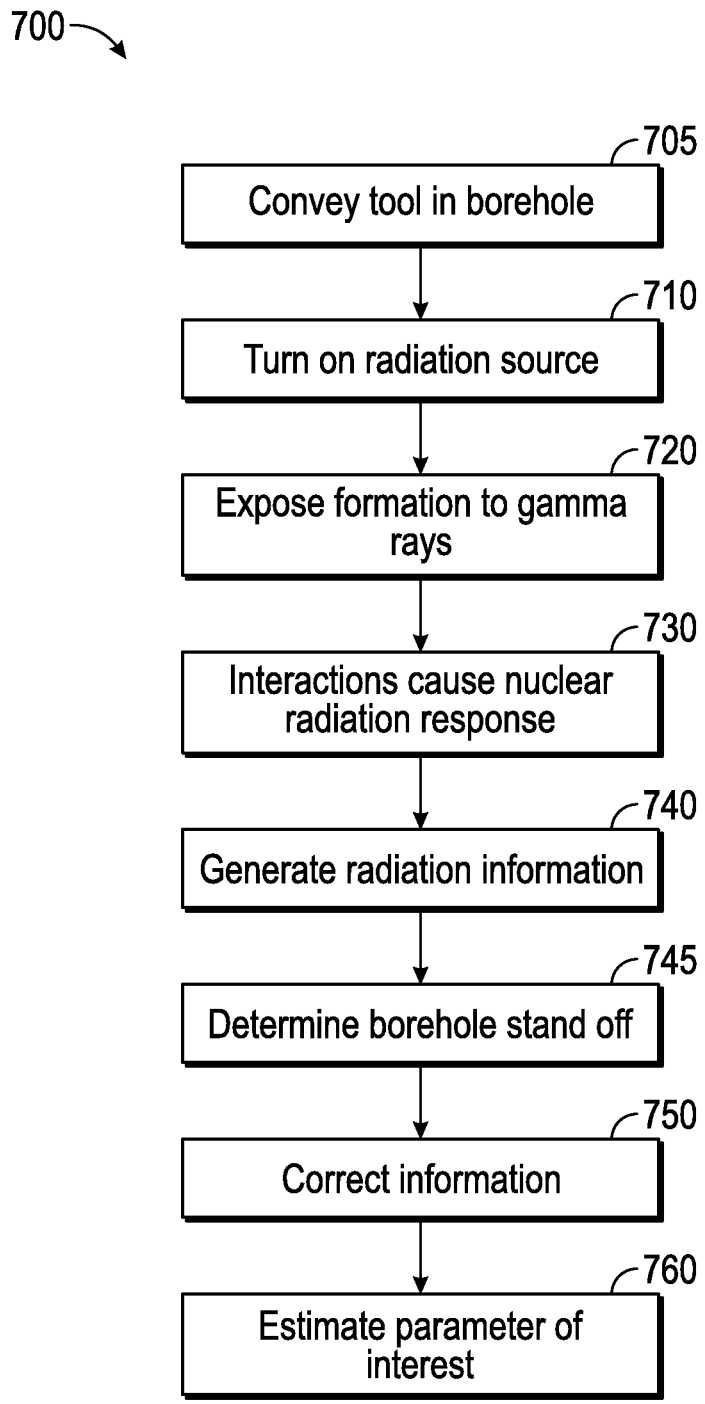
FIG. 7 shows a flow chart for estimating at least one parameter of interest of a volume of an earth formation in accordance with embodiments of the present disclosure.

FIG. 7 shows a flow chart 700 for estimating at least one parameter of interest of a volume of an earth formation in accordance with embodiments of the present disclosure. The parameter of interest may include at least one of: i) bulk density; ii) porosity; and iii) density. In optional step 705, the tool may conveyed in a borehole intersecting a volume. In optional step 710, a source of radiation 240 may be turned on. In step 720, at least part of the earth formation 195 is exposed to gamma rays emitted by the gamma ray source in the tool. In step 730, interaction with the nuclear radiation emissions and the earth formation 195 may result in nuclear radiation response 270 from earth formation 195. In step 740, measurement occurs when one or more nuclear radiation sensors 210, 220 may generate radiation information in the form of detection signals in response to nuclear radiation responses 270. This may be carried out by rotating the tool; and making a plurality of measurements over a time interval during continuing rotation of the tool. In optional step 745, borehole standoff is determined using one or more sensors, as described above, and associated with each measurement of the radiation information. Determining the estimated standoff may be carried out by at least one of: i) deriving the estimated standoff from mechanical measurements; ii) deriving the estimated standoff from acoustic measurements; iii) predicting the estimated standoff from nuclear measurement. In step 750, the information representing measurements of nuclear radiation 270 may be corrected in dependence upon standoff associated with each measurement. In step 760, a parameter of interest of the formation may be estimated using corrected information.

Herein, "information" may include raw data, processed data, analog signals, and digital signals. In some embodiments, the model may include, but is not limited to, one or more of: (i) a mathematical equation, (ii) an algorithm, (iii) an energy spectrum deconvolution technique, (iv) a stripping technique, and (v) an energy spectrum window technique. The at least one parameter of interest may include, but is not limited to, one or more of: (i) density, (ii) porosity, and (iii) fluid saturation. A description for some embodiments estimating the at least one parameter of interest follows below.

In some embodiments, applying the correction or estimation of the parameter of interest may involve applying a model. The model may include, but is not limited to, (i) a mathematical equation, (ii) an algorithm, (iii) an energy spectrum deconvolution technique, (iv) an energy spectrum stripping technique, (v) an energy spectrum window technique, or a combination thereof.

Figure 8:
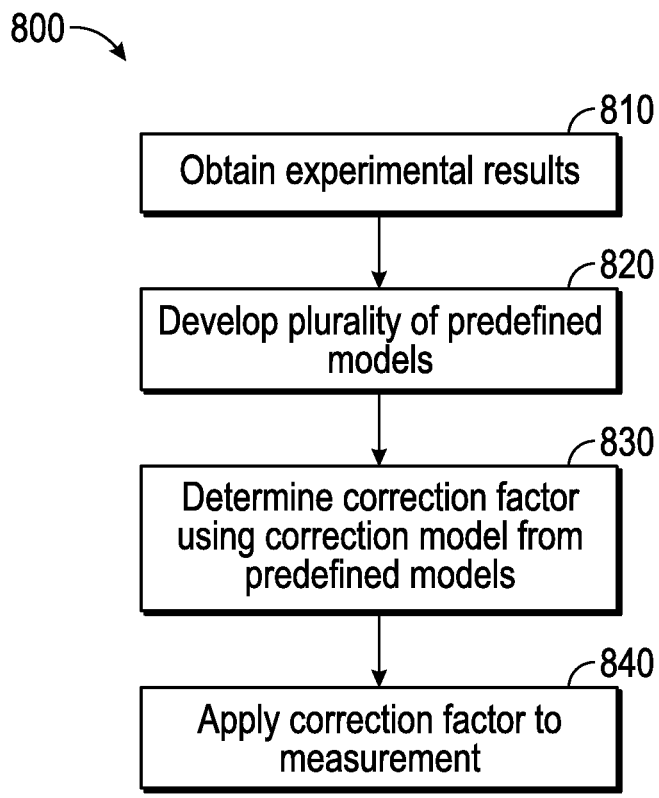
FIG. 8 shows a flow chart for correcting a measurement relating to the parameter of interest in accordance with embodiments of the present disclosure.

FIG. 8 shows a flow chart 800 for correcting a measurement relating to the parameter of interest using at least one correction model determined from a plurality of predefined models according to one embodiment of the present disclosure. In optional step 810, experimental measurement results are obtained. In optional step 820, a plurality of predefined models are developed. Each model may be tailored to a standoff value or a group of standoff values and associated with the standoff value or group of standoff values. These models may be developed from the experimental measurement results.

In step 830, a processor may be used for determining a correction factor. The correction factor may be determined using at least one correction model determined from a plurality of predefined models. Step 830 may include determining the model based on an estimated borehole standoff of the tool from the borehole wall that is associated with the measurement. Each of the plurality of predefined models may be associated with each of a plurality of standoff bins. Each of the plurality of standoff bins may be defined as a mutually exclusive interval of distance values from the downhole tool to the borehole wall. Each of the plurality of predefined models may include a corresponding one of a plurality of bin specific ribs. For example, step 830 may include using a conventional spine and rib method for determining from said plurality of LS and SS measurements and their associated standoffs the plurality of measurements.

Step 830 may include correcting the measurement using a plurality of weighted borehole standoff correction models. For example, correcting the measurement may include selecting bins with a threshold number of measurements and weighting each bin. The bins may be weighted according to the formula $$\overline{\Delta\rho} = \int_{Min\ Std}^{Max\ Std} \Delta\rho(r) \text{Std}(r) dr.$$

Each model of the plurality of predefined models may be represented as a function of the measurement, such as, for example, a polynomial function or the like. Each borehole standoff correction model of the at least one borehole standoff correction model may be represented as a function of the measurement and the associated standoff. Step 840 may include applying the correction factor to the measurement using a processor.

Figure 9:
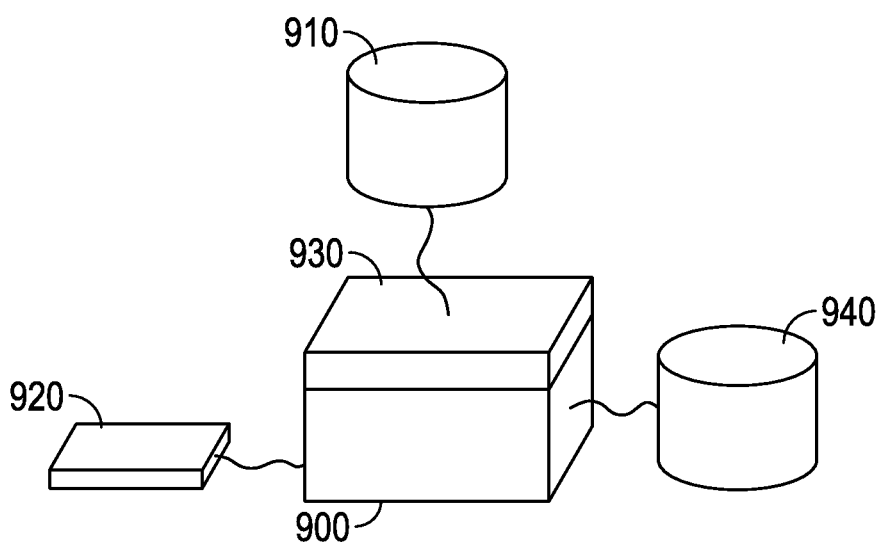
FIG. 9 illustrates a hardware environment in accordance with embodiments of the present disclosure.

As shown in FIG. 9, certain embodiments of the present disclosure may be implemented with a hardware environment that includes an information processor 900, a information storage medium 910, an input device 920, processor memory 930, and may include peripheral information storage medium 940. The hardware environment may be in the well, at the rig, or at a remote location. Moreover, the several components of the hardware environment may be distributed among those locations. The input device 920 may be any information reader or user input device, such as data card reader, keyboard, USB port, etc. The information storage medium 910 stores information provided by the detectors. Information storage medium 910 may be any standard computer information storage device, such as a ROM, USB drive, memory stick, hard disk, removable RAM, EPROMs, EAROMs, EEPROM, flash memories, and optical disks or other commonly used memory storage system known to one of ordinary skill in the art including Internet based storage. Information storage medium 910 stores a program that when executed causes information processor 900 to execute the disclosed method. Information storage medium 910 may also store the formation information provided by the user, or the formation information may be stored in a peripheral information storage medium 940, which may be any standard computer information storage device, such as a USB drive, memory stick, hard disk, removable RAM, or other commonly used memory storage system known to one of ordinary skill in the art including Internet based storage. Information processor 900 may be any form of computer or mathematical processing hardware, including Internet based hardware. When the program is loaded from information storage medium 910 into processor memory 930 (e.g. computer RAM), the program, when executed, causes information processor 900 to retrieve detector information from either information storage medium 910 or peripheral information storage medium 940 and process the information to estimate a parameter of interest. Information processor 900 may be located on the surface or downhole.

A source with "substantially constant intensity" may not change during logging, or the source intensity variation may be sufficiently small such that it is negligible with regard to estimation of density, porosity, or other parameter of interest. An "interaction" may be described as an event causing a change in energy and direction of incident radiation (e.g., a gamma ray) prior to measurement of the radiation and absorption of the radiation.

Herein, the term "information" may include, but is not limited to, one or more of: (i) raw data, (ii) processed data, and (iii) signals. The term "conveyance device" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire-line sondes, slickline sondes, drop shots, downhole subs, BHA's, drill string inserts, modules, internal housings and substrate portions thereof, self-propelled tractors. As used above, the term "sub" refers to any structure that is configured to partially enclose, completely enclose, house, or support a device. The term "information" as used above includes any form of information (Analog, digital, EM, printed, etc.). The term "information processing device" herein includes, but is not limited to, any device that transmits, receives, manipulates, converts, calculates, modulates, transposes, carries, stores or otherwise utilizes information. An information processing device may include a microprocessor, resident memory, and peripherals for executing programmed instructions. The "correction factor" may be applied in additive (or subtractive) or multiplicative fashion to the radiation information.

While the foregoing disclosure is directed to the one mode embodiments of the disclosure, various modifications will be apparent to those skilled in the art. It is intended that all variations be embraced by the foregoing disclosure.

What is claimed is:

1. A method of estimating a parameter of interest of a volume of an earth formation, comprising:
    estimating, with at least one processor, a plurality of density measurements relating to the parameter of interest using radiation counts from a downhole tool, with the at least one processor configured to associate each density measurement of the plurality of density measurements with one of a plurality of standoff bins corresponding to values for an estimated borehole standoff of the tool from a borehole wall while recording those counts associated with each density measurement in a non-transitory computer-readable storage medium accessible to the processor;
    determining a compensated density value for each standoff bin with the at least one processor by correcting each density measurement of the plurality of density measurements using a correction model determined from a plurality of predefined models based on the standoff bin associated with the particular density measurement by using a standoff distribution profile to assign weights to the corrections due to standoff within the standoff bin over a range of standoff values corresponding to the standoff bin;
    using the compensated density values for at least one standoff bin to determine a final compensated density value; and
    outputting the final compensated density value.

2. The method of claim 1, wherein correcting each density measurement comprises determining a correction factor using the correction model and applying the correction factor to each density measurement.

3. The method of claim 1, wherein each of the plurality of predefined models is associated with each of a plurality of standoff bins, wherein each of the plurality of standoff bins is defined as a mutually exclusive interval of distance values from the downhole tool to the borehole wall, and wherein correcting each density measurement further comprises:
    applying to each density measurement the correction model corresponding to the estimated borehole standoff associated with each density measurement.

4. The method of claim 3 wherein each of the plurality of predefined models is mutually exclusive to the associated bin.

5. The method of claim 4 wherein each of the plurality of predefined models comprises a corresponding one of a plurality of bin specific ribs.

6. The method of claim 5 wherein each of the plurality of bin specific ribs is determined from pre-existing results.

7. The method of claim 1, further comprising correcting each density measurement using a plurality of weighted correction models.

8. The method of claim 7, further comprising selecting bins with a threshold number of measurements and weighting each correction model corresponding to each selected bin according to the formula $$\overline{\Delta\rho} = \int_{Min\ Std}^{Max\ Std} \Delta\rho(r) \mathrm{Std}(r) dr,$$

where $\Delta\rho$ is a correction factor and Std (r) is a standoff function.

9. The method of claim 1, wherein each predefined model of the plurality of predefined models is represented as a function of the corresponding measurement.

10. The method of claim 1 further comprising determining the estimated standoff.

11. The method of claim 10 wherein determining the estimated standoff comprises at least one of: i) deriving the estimated standoff from mechanical measurements; ii) deriving the estimated standoff from acoustic measurements; iii) predicting the estimated standoff from nuclear measurement.

12. The method of claim 11, further comprising:
    generating radiation information using a sensor in a borehole in the earth formation.

13. The method of claim 12 further comprising:
    (a) conveying the downhole tool into a borehole intersecting the volume;
    (b) rotating the tool;
    (c) making a plurality of measurements relating to the parameter of interest using nuclear sensors on the downhole tool over a time interval during continuing rotation of the tool.

14. The method of claim 1 wherein the parameter of interest comprises at least one of: i) bulk density; ii) porosity; and iii) density.

15. An apparatus for estimating a parameter of interest of a volume of an earth formation, the apparatus comprising:
a conveyance device configured to be conveyed in a borehole intersecting the earth formation, the conveyance device comprising at least one nuclear sensor configured to make measurements of the volume relating to the parameter of interest;
a caliper associated with the conveyance device and configured to determine a standoff of the at least one sensor relative to a wall of the borehole;
a processor configured to:
estimate a plurality of density measurements relating to the parameter of interest using radiation counts from the at least one nuclear sensor, with the at least one processor configured to associate each density measurement of the plurality of density measurements with one of a plurality of standoff bins corresponding to values for the standoff from the caliper while recording the counts associated with each density measurement in a non-transitory computer-readable storage medium accessible to the processor;
determine a compensated density value for each standoff bin by correcting each density measurement of the plurality of density measurements using a correction model determined from a plurality of predefined models based on the standoff bin associated with the particular density measurement by using a standoff distribution profile to assign weights to the corrections due to standoff over a range of standoff values corresponding to the standoff bin;
use the compensated density values for at least one standoff bin to determine a final compensated density value; and
output the final compensated density value.

16. A method of estimating a parameter of interest of a volume of an earth formation, comprising:
estimating, with at least one processor, a plurality of density measurements relating to the parameter of interest using radiation counts from a downhole tool, with the at least one processor configured to associate each density measurement of the plurality of density measurements associated with an estimated borehole standoff of the tool from a borehole wall while recording those counts associated with each density measurement in a non-transitory computer-readable storage medium accessible to the processor;
determining a final compensated density value from each density measurement of the plurality of density measurements using a correction model, wherein the correction model comprises a weighting of corrections due to standoff over a range of standoff values corresponding to the measurements using a plurality of ribs connected via a virtual surface, with each rib of the plurality corresponding to a specific standoff value.

* * * * *